(12) United States Patent  
Pande et al.

(10) Patent No.: US 8,799,057 B2  
(45) Date of Patent: Aug. 5, 2014

(54) SYSTEM AND METHOD FOR ASSESSMENT AND CONSOLIDATION OF CONTRACTOR DATA

(75) Inventors: Milind Pande, Mumbai (IN); Ravi Ayanala, Pune (IN); Virat Bhartiya, Pune (IN)

(73) Assignee: Infosys Limited, Bangalore (IN)

( * ) Notice: Subject to any disclaimer, the term of this patent is extended or adjusted under 35 U.S.C. 154(b) by 180 days.

(21) Appl. No.: 13/342,527

(22) Filed: Jan. 3, 2012

(65) Prior Publication Data

US 2013/0173352 A1    Jul. 4, 2013

(51) Int. Cl.
    G06Q 10/00    (2012.01)
    G06Q 10/06    (2012.01)

(52) U.S. Cl.
    CPC .................... G06Q 10/0639 (2013.01)
    USPC .......................... 705/7.38; 705/7.11

(58) Field of Classification Search
    CPC .................................... G06Q 10/0639
    USPC ............................. 705/7.11–7.42
    See application file for complete search history.

(56) References Cited

U.S. PATENT DOCUMENTS

| | | | | |
|---|---|---|---|---|
| 6,182,275 | B1 * | 1/2001 | Beelitz et al. | 717/175 |
| 6,961,873 | B2 * | 11/2005 | Dubovsky | 714/38.13 |
| 7,167,855 | B1 * | 1/2007 | Koenig | 1/1 |
| 7,191,139 | B2 * | 3/2007 | Roy et al. | 705/321 |
| 8,001,160 | B2 * | 8/2011 | Weisflog | 707/802 |
| 8,032,390 | B2 * | 10/2011 | Waguet | 705/1.1 |
| 8,200,527 | B1 * | 6/2012 | Thompson et al. | 705/7.39 |
| 8,224,472 | B1 * | 7/2012 | Maluf et al. | 700/97 |
| 2002/0095357 | A1 * | 7/2002 | Hunter et al. | 705/27 |
| 2002/0120462 | A1 * | 8/2002 | Good | 705/1 |
| 2002/0143599 | A1 * | 10/2002 | Nourbakhsh et al. | 705/9 |
| 2002/0147708 | A1 * | 10/2002 | Thomas et al. | 707/3 |
| 2004/0078257 | A1 * | 4/2004 | Schweitzer et al. | 705/9 |
| 2004/0107192 | A1 * | 6/2004 | Joao | 707/3 |
| 2004/0193476 | A1 * | 9/2004 | Aerdts | 705/10 |
| 2005/0102394 | A1 * | 5/2005 | Loveland | 709/224 |
| 2005/0182743 | A1 * | 8/2005 | Koenig | 707/1 |
| 2006/0149579 | A1 * | 7/2006 | Weild | 705/1 |
| 2006/0224435 | A1 * | 10/2006 | Male et al. | 705/10 |
| 2007/0162321 | A1 * | 7/2007 | Behrmann et al. | 705/9 |
| 2008/0027783 | A1 * | 1/2008 | Hughes et al. | 705/9 |
| 2008/0133301 | A1 * | 6/2008 | Calderaro et al. | 705/7 |
| 2008/0243579 | A1 * | 10/2008 | Dan et al. | 705/8 |
| 2008/0313002 | A1 * | 12/2008 | McFarland et al. | 705/8 |
| 2008/0313008 | A1 * | 12/2008 | Lee et al. | 705/10 |
| 2009/0112701 | A1 * | 4/2009 | Turpin et al. | 705/10 |
| 2010/0114971 | A1 * | 5/2010 | Weisflog | 707/802 |

(Continued)

*Primary Examiner* — Justin M Pats
*Assistant Examiner* — Richard Scheunemann
(74) *Attorney, Agent, or Firm* — Klarquist Sparkman, LLP (57) ABSTRACT

Solutions are provided for assessing and consolidating contractor data in an organization from a plurality of data sources. Contractor data from a plurality of data sources is collected, wherein the data sources comprise existing information systems, surveys and interviews. The collected contractor data is segmented using a decision matrix, wherein the decision matrix comprises a plurality of predefined functional units and a plurality of vendors, roles and experience bands. The segmented contractor data is evaluated for its impact on ongoing business activities in the organization, wherein the evaluation of the segmented contractor data comprises performing at least contractor assessment and application assessment. Further, the evaluated contractor data is consolidated to form at least one logical cluster within a plurality of predefined categories, wherein the predefined categories comprise functional unit, application platform, and technology platform and service type and presented to a user.

16 Claims, 9 Drawing Sheets

(56) References Cited

U.S. PATENT DOCUMENTS

2010/0235202 A1* 9/2010 Strelling et al. ............ 705/7
2011/0066466 A1* 3/2011 Narayanan ............ 705/7.36
2012/0116848 A1* 5/2012 Gargiulo et al. .......... 705/7.36

* cited by examiner

| Index | | |
|---|---|---|
| Functional Area 410 | Vendor in FA 420 | Levels of Evaluation 450 |
| Level of vendor Fragmentation<br><br>411 | Value Chain Position<br><br>421 | Vendor Evaluation within functional area<br><br>430 |
| Application Complexity<br><br>412 | Dependency<br><br>422 | Individual Vendor Evaluation across functional area<br><br>440 |
| Business Criticality of application<br><br>413 | Depth & Breadth<br><br>423 | |
| Health Index of application<br><br>414 | Size<br><br>424 | |
| People Risk<br><br>415 | Niche skill set<br><br>425 | |
| | Value<br><br>426 | |

SYSTEM AND METHOD FOR ASSESSMENT AND CONSOLIDATION OF CONTRACTOR DATA

FIELD

The present invention relates generally to contractor assessment, and more particularly to a system and method for assessment and consolidation of contractors in an information technology (IT) domain.

BACKGROUND

IT in most organizations has grown at an unmanageable pace to keep up with the ever changing business and beat the technology obsolesce. In all this haste, there has been little time to focus on crafting a supplier strategy. As a result, IT landscapes have witnessed a proliferation of vendors. This undesirable fragmentation leads to operational overheads, higher costs, process variance, and lack of strategic direction—sub optimal service framework. Spurred by business demands and technology change, corporate IT organizations looked to overcome resource shortage and fill gaps by taking on a mix of independent contractors, staffing agencies and domestic and offshore service providers. In the process of outsourcing, bringing disparate external staffing and sourcing operations together has been part of larger effort, ranging from the centralization of sourcing management and governance to the transformation of the sourcing strategy as a whole and its alignment with the client business strategy.

Existing prior art does not suggest or anticipate a process for contractor evaluation and consolidation for the purpose of outsourcing. There is no formal process or methodology in place for contractor consolidation. Therefore, there is a need for a contractor consolidation process to assess the contractor base of an IT organization for consolidation.

SUMMARY

The present disclosure relates to solutions for assessing and consolidating contractor data (e.g., in an organization from a plurality of data sources).

For example, a method can be provided for assessing and consolidating contractor data in an organization from a plurality of data sources. The method can comprise collecting the contractor data from the plurality of data sources, where data sources comprise existing information systems, surveys and interviews, segmenting the collected contractor data using a decision matrix, where the decision matrix comprises a plurality of predefined functional units and a plurality of vendors and their roles and experience bands, evaluating the segmented contractor data for its impact on ongoing business activities in the organization, where the evaluation of the segmented contractor data comprises performing at least contractor assessment and application assessment, and consolidating the evaluated contractor data to form at least one logical cluster within a plurality of predefined categories, wherein the predefined categories comprise functional unit, application platform, technology platform and service type.

As other examples, systems and computer-readable media can be provided for assessing and consolidating contractor data from a plurality of data sources.

DETAILED DESCRIPTION

Disclosed embodiments provide computer-implemented method, systems and computer readable media for selection, evaluation and consolidation of contractors in an IT domain.

While systems and methods are described herein by way of example and embodiments, those skilled in the art recognize that systems and methods for consolidation of contractors are not limited to the embodiments or the diagrams described. It should be understood that drawings and descriptions are not intended to be limiting to the particular form disclosed. As used herein, the word "may" is used in a permissive sense (i.e., meaning having the potential to) rather than the mandatory sense (i.e., meaning must). Similarly, the words "include", "including", and "includes" mean including, but not limited to.

Figure 1:
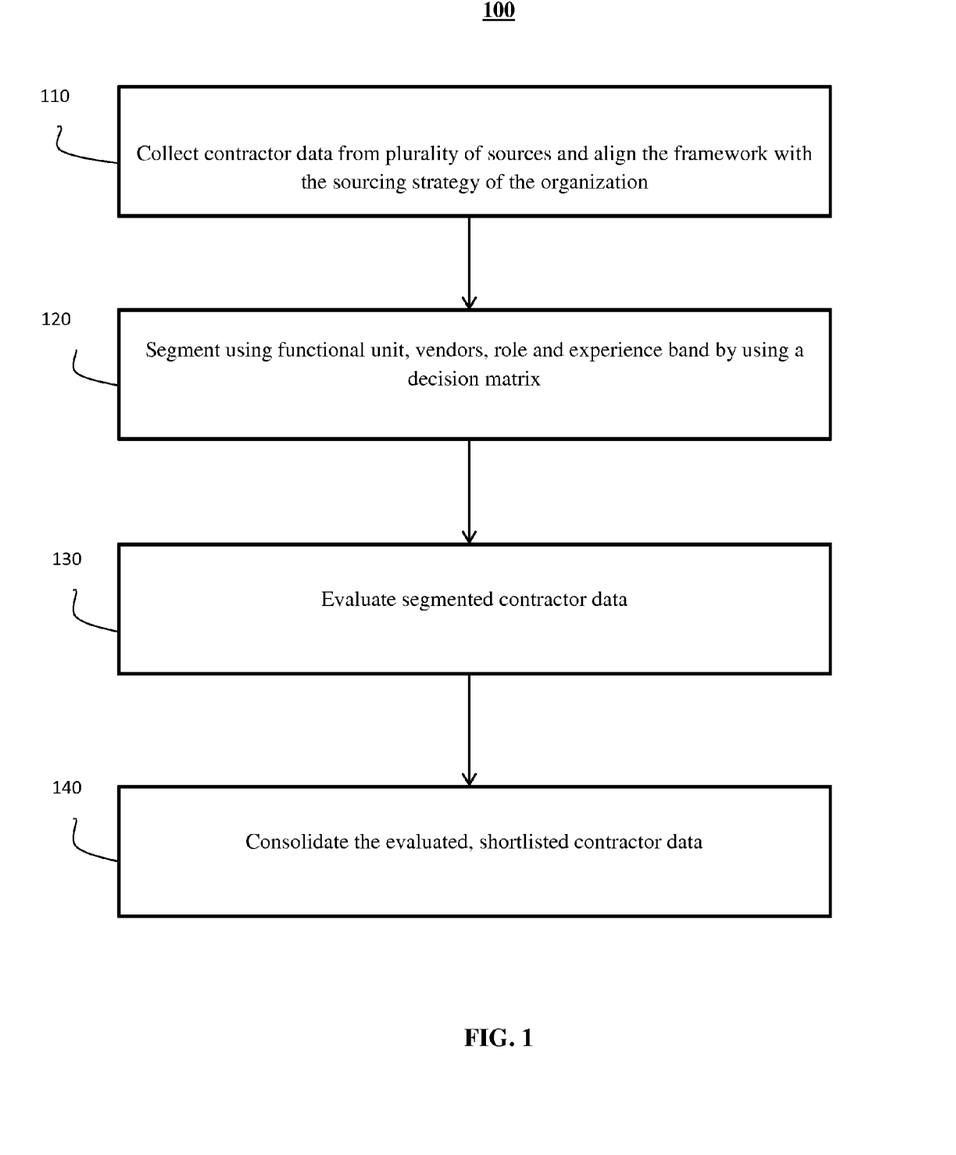
FIG. 1 shows an exemplary process flow of steps performed for the consolidation of contractors.

FIG. 1 shows an exemplary process flow of steps performed for the consolidation of contractors. FIG. 1 includes a step 110 for collecting data and aligning the framework with the sourcing strategy of the organization, a step 120 for segmenting data, a step 130 for evaluating segmented data, and a step 140 for consolidating segmented data. According to an embodiment of the invention, step 110 may be referred to as a pre-assessment stage and step 120 may be referred to as first phase in contractor assessment and consolidation process. Further as used in context with this description, framework refers to framework customization of the consolidation process. The purpose of framework customization track is to capture, clarify and document the specific goals and objectives of the consolidation exercise. Typically, the client has a structured thought process around the key sourcing decisions that they expect to be carried forward during and beyond the consolidation initiative. For example, the level of outsourcing in certain departments/units would be determined by the degree of differentiation its constituent processes bring to the overall core competency of the organization. According to another embodiment of the invention, the segmentation criteria is aligned with these long term sourcing choices that have already been made, in line with the business strategy of the client's organization.

According to an embodiment of the invention, at step 110, a data source is identified and data related to contractor and application is collected. The data may be collected through a plurality of information systems and external sources. As used herein, an information system refers to any information repositories at the client's or user's end that store employee and application data. For instance, the data may be collected through HR systems, application dictionaries, vendor management systems, project management systems and so forth.

Similarly, in the context of this disclosure, the external sources include, but are not limited to, interviews and surveys.

At step 120, the collected contractor data is segmented based upon a plurality of criterion. In an embodiment, the plurality of criterion includes but is not limited to, function of vendor, functional unit, role and experience. Further the suitability of functional unit for consolidation is determined by analyzing the pluralities of considerations of the functional units that include but are not limited to, vendor fragmentation, complexity of applications, criticality of applications, health index of applications and people risk.

At step 130, the segmented vendors and contractors from the previous step (that is, step 120) and associated application(s) are further evaluated to assess the overall impact on the ongoing business activities in the organization and their suitability for consolidation is determined. The segmented contractor data may be evaluated on a plurality of tracks including, but not limited to, contractor assessment and application assessment. The contractor assessment may be done on plurality of key attributes that indicate the coupling of the contractor(s) with the IT landscape. These plurality of key attributes includes, but is not limited to, service duration, responsibility, skill, knowledge, performance, and cost. In application assessment, an assessment of applications that the segmented contractors develop, enhance, maintain and support is done. The applications may be assessed based on a plurality of attributes that include, but are not limited to, business criticality, health index, process maturity, complexity of the applications developed, enhanced, maintained and supported by the segmented contractors.

At step 140, the evaluated segmented contractor data is consolidated to form logical clusters within a plurality of predefined categories. The predefined categories include, but are not limited to, functional units, application or technology platforms, service types and project execution methodologies.

According to an embodiment of the invention, after each of the steps 110, 120, 130 and 140, data corresponding to one or more contractors is deleted based on the outcome of the activity carried out in the respective step. In other words, data corresponding to one or more contractors based on segmentation and assessment results in successive reduction in the count of contractors under consideration for consolidation in each of the step.

Figure 2:
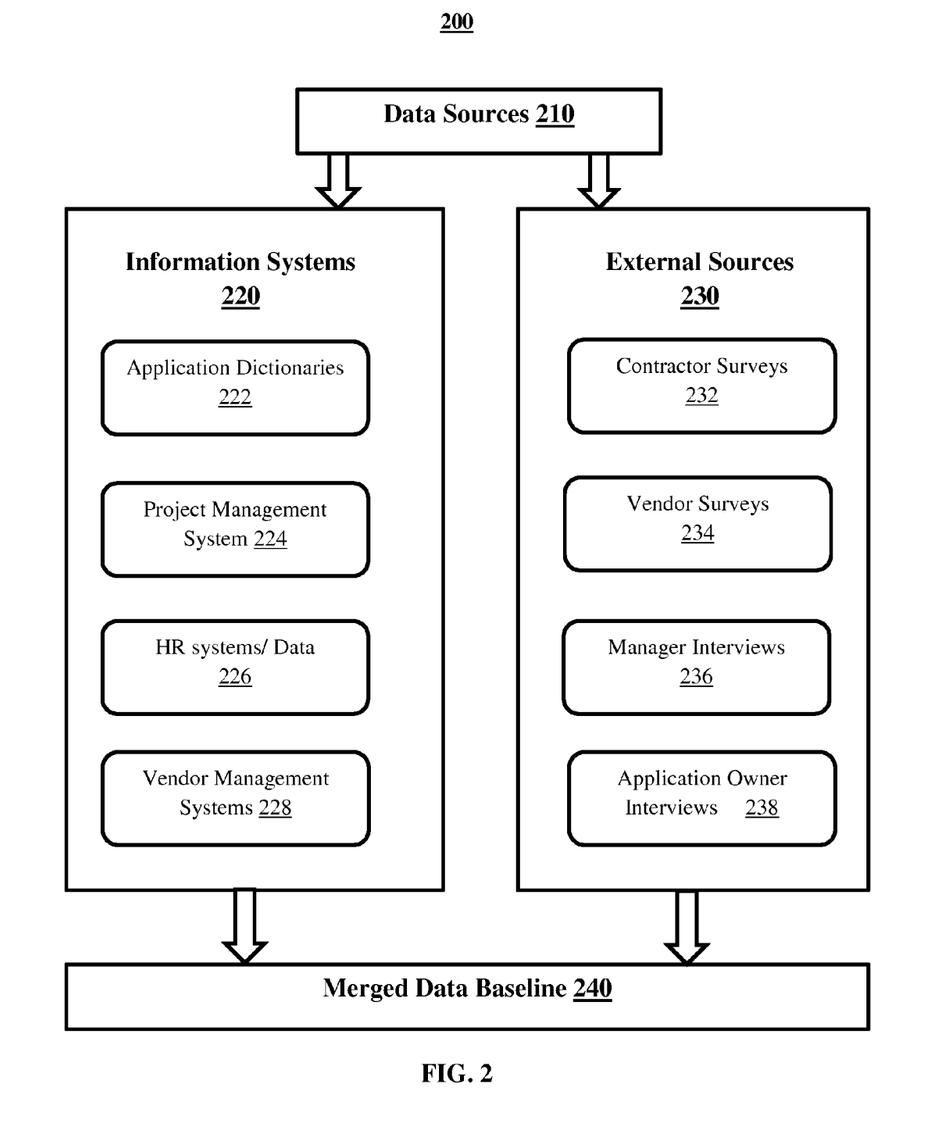
FIG. 2 shows an exemplary architecture for collecting and storing contractor data.

FIG. 2 shows an exemplary architecture for collecting and storing contractor data. FIG. 2 includes data sources 210 and merged data baseline 240. Data sources comprise of information system 220 and external sources 230. Further information systems 220 comprise of application dictionaries 220, project management system 224, human resources (HR) systems 226 and vendor management systems 228. On the other hand external sources comprise of contractor surveys 232, vendor surveys 234, manager interviews 236 and application owner interviews 238.

Referring to FIG. 2, data from different sources is merged into a data baseline 240. As described earlier in conjunction with FIG. 1, information systems may refer to the repositories at the client or users end used for storing data. Information system includes but is not limited to application dictionaries 222, project management system 224, human resources (HR) systems 226 and vendor management systems 228. Further the external sources include, but are not limited to, contractor surveys 232, vendor surveys 234, manager interviews 236 and application owner interviews 238. Information that is not available in any such information systems is collected through external sources.

Figure 3:
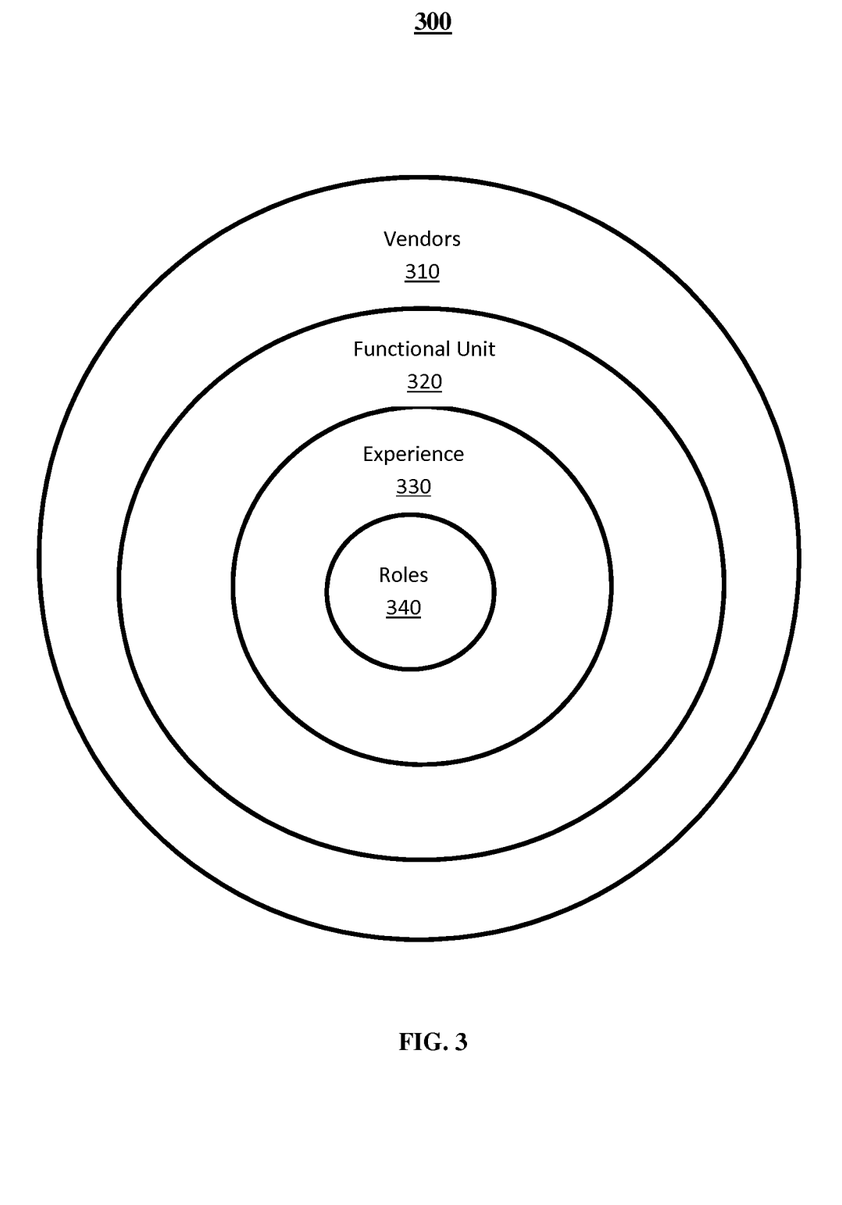
FIG. 3 shows an exemplary conceptual diagram for segmentation criteria.

FIG. 3 shows an exemplary architecture for segmentation of data for consolidation. According to an embodiment of the invention, segmentation is the first phase in contractor assessment and consolidation process. Segmentation guides the users in reducing the target data for assessment, based on a plurality of criteria.

According to an embodiment of the invention, segmentation refers to a first level filtration of data where the aim is to select the most suitable vendors 310, functional units 320, experience bands 330 and roles 340 that will yield maximum benefit at minimum risk.

Figure 4A:
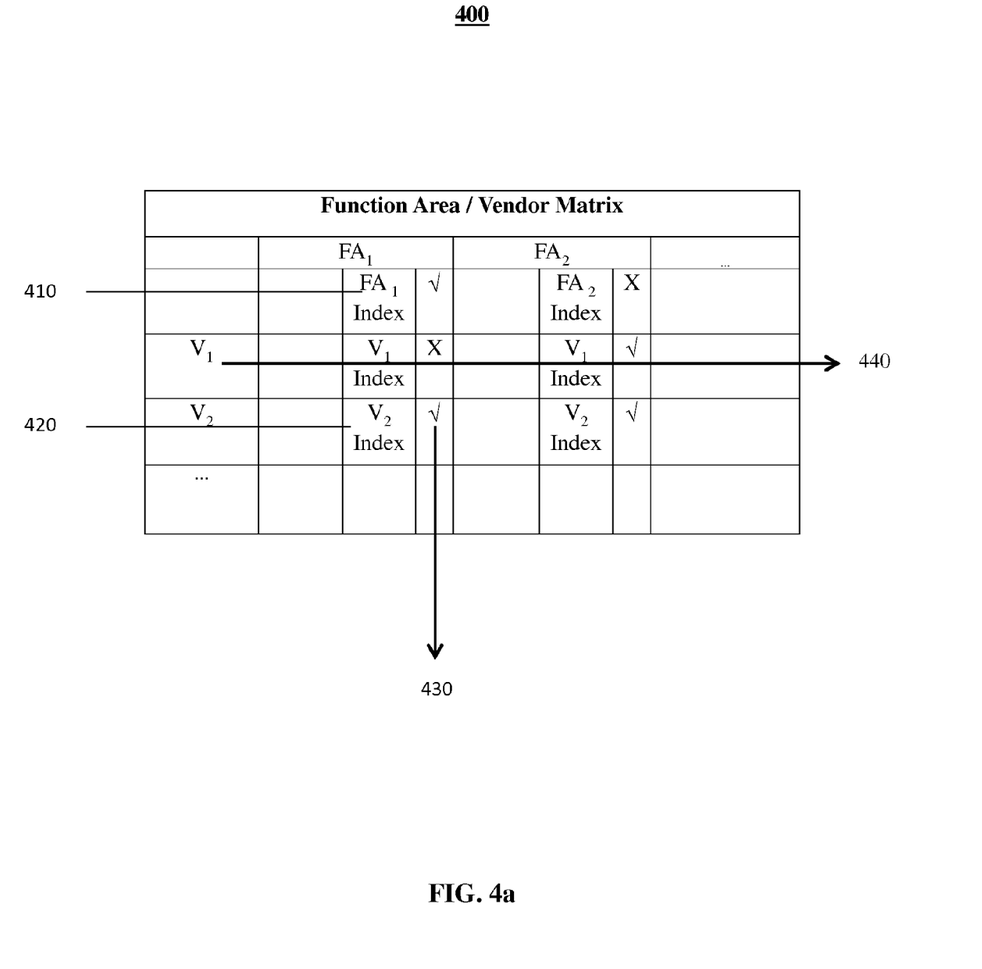
FIG. 4a shows an exemplary conceptual diagram for segmentation of contractors by functional area and vendors.
Figure 4B:
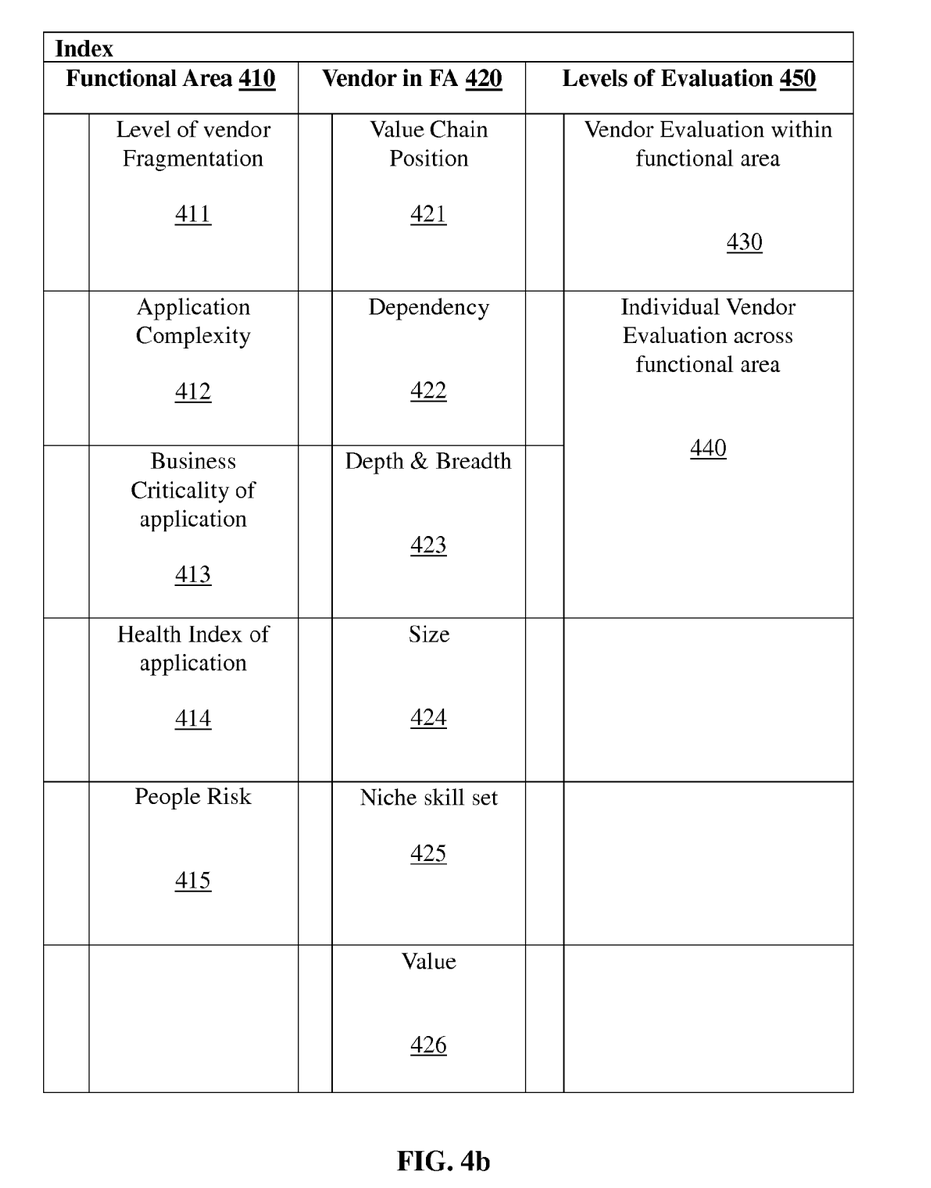
FIG. 4b shows an exemplary conceptual diagram for segmentation of contractors by functional area and vendors with additional detail.

FIGS. 4a and 4b show an exemplary conceptual diagram for segmentation and assessment of vendors by functional area. Referring to FIGS. 4a and 4b, the segmentation and assessment are done through functional area index 410 and vendor index 420. The assessment is done by evaluating vendors' position within a functional area 430. Further, the assessment of individual vendors is done across functional area 440.

Functional area index 410 includes level of vendor fragmentation 411, application complexity 412, business criticality of application 413, health index of applications 414 and people risk 415. Vendor index 420 includes vendor position in value chain 421, dependency on vendor 422, breadth and depth of vendor 423, size of vendor 424, niche skill set of vendor 425 and value of the vendor 426.

According to an embodiment of the invention, the suitability of a functional unit for consolidation is determined by analyzing vendor fragmentation 411, wherein the vendor fragmentation is calculated by finding the ratio of contractors to vendors in that functional unit. A low value implies higher vendor fragmentation, indicating a favorable case for consolidation in the functional unit. Application complexity 412 refers to the average complexity of applications in the functional unit and is computed based on the relative complexity of the system design, platform and sub-domain. It should be noted that functional units with high complexity may require higher effort during consolidation, indicating higher cost involved.

Business criticality of application 413 refers to the average criticality of applications in the functional unit. A high criticality may indicate higher business risk involved in consolidating the functional unit. Health index of applications 414 indicates the overall health of applications in the functional unit. In an embodiment, a functional unit with a high health index may be favorably positioned for consolidation. According to still another embodiment of the invention, people risk 415 is calculated by finding the ratio of contractors to employees. Functional units with very low count of employees may run a significantly higher risk during consolidation owing to their increased exposure in the event of contractor attrition.

According to an embodiment of the invention, vendors within each selected functional unit are targeted for consolidation by considering a plurality of attributes. Further, the vendors are consolidated based on vendor position in value chain 421. Thus, across the value chain, the vendors may be categorized as strategic vendors, niche vendors, specialty vendors and preferred vendors based upon their position in value chain.

According to an embodiment of the invention, strategic vendors are highly ranked vendors who provide a mixture of high-level thought leadership and technical resources. Further, they have the capability to cover a variety of industry trends and have in-depth knowledge of many technical platforms. Niche vendors possess expertise in proprietary software or specialize in unique technologies. Specialty vendors specialize in one or more specific technologies and maintain a large bench within their specialty offering. Preferred vendors provide general IT skills, primarily in staff augmentation mode and are ranked at the lower end of the vendor value chain.

According to an embodiment of the invention, lower the ranking of a vendor in a value chain, higher is the potential for replacing that vendor.

According to another embodiment of the invention, vendors within each selected functional unit are consolidated based on dependency on vendor 422 and depth and breadth of vendor 423, wherein the breadth of the vendor is a percentage of contractors from the vendor in the functional unit, indicating the spread of the vendor in the functional unit, and the depth of the vendor is the percentage of contractors from the vendor working on niche and proprietary skills, indicating the vendors level of specialization. Further, the vendors within each selected functional unit may be consolidated based on size of vendor 424, niche skill set 425 and value 426 of the vendor. The niche skill may imply expertise in proprietary software or specializing in unique technologies such as Brio, Pega and alike. Further the value of the vendor may imply the value for money, overall performance, satisfaction index delivered by the vendor.

According to an embodiment of the invention, vendors may be selected for removal from more than one functional unit. Such vendors may also be removed from the entire organization, if they are found to be suitable for removal from most functional units. Other considerations such as experience bands and roles may also be utilized to help mitigate the associated risk to the ongoing business in the organization. For example, less experienced contractors may be easier to replace due to lesser dependency.

Figure 5:
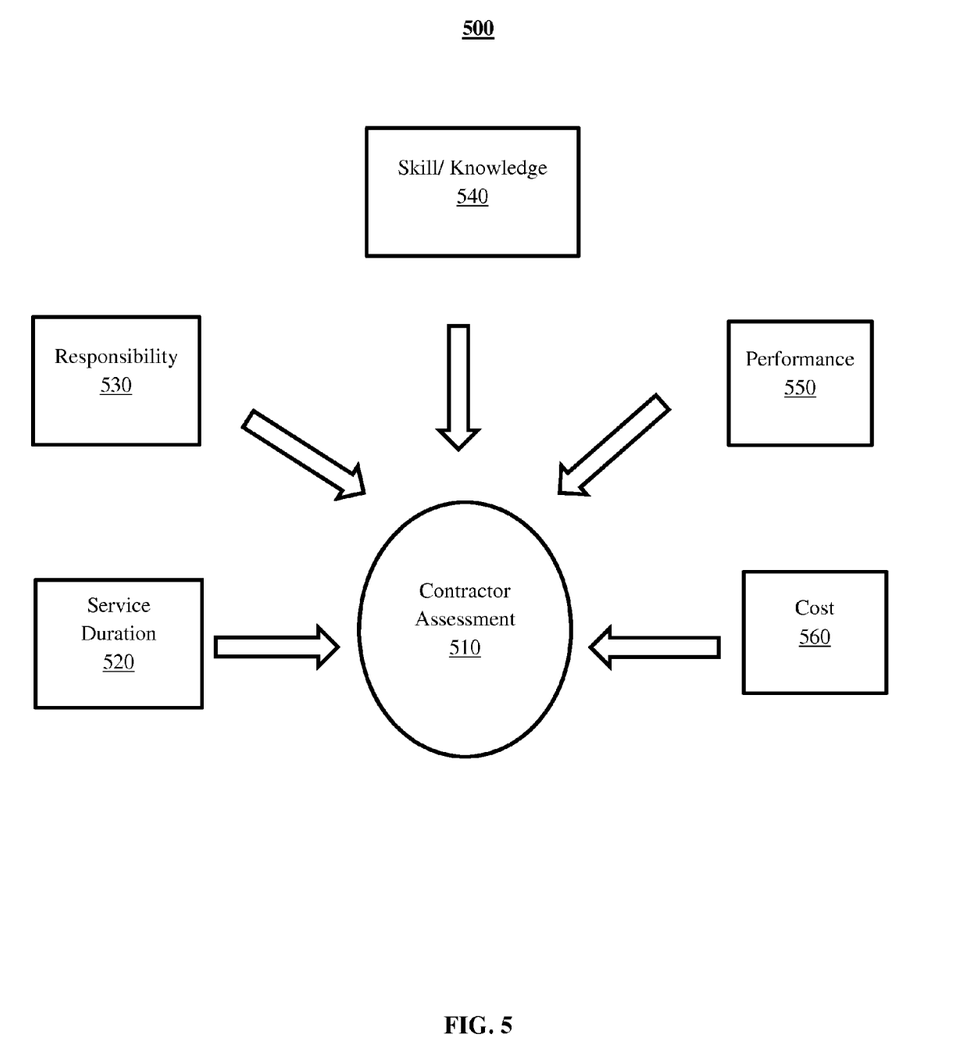
FIG. 5 shows an exemplary conceptual diagram for contractor assessment.

FIG. 5 shows an exemplary conceptual diagram for contractor assessment 510. Referring to FIG. 5 segmented contractors are further assessed on a plurality of attributes that include, but are not limited to, service duration 520, responsibility 530, skill or knowledge 540, performance 550 and cost 560.

According to an embodiment of the invention, contractor assessment 510 focuses on evaluating contractors to determine the degree of dependence on them measuring them on set of attributes. Service duration 520 refers to experience of the contractor in its current role, organization and total IT experience. Responsibility 530 is measured by plurality of parameters including, but not limited to, role, service line, number of applications, availability of backups and end user interaction. Skill or knowledge 540 involves technical and domain competency, experience in multiple technologies, and knowledge of rare technologies of a contractor. Performance 550 includes appraisal ratings and service level agreement (SLA) breaches of a contractor. Finally, the contractor assessment is done based on cost 560 of the contractor if other parameters remain favorable.

According to an embodiment of the invention, contractor assessment 510 is done to assess the overall impact on ongoing business and thus determine the suitability of the contractors for consolidation. For instance, low performance may contribute to higher replaceability scores while higher cost may imply higher replaceability. Similarly, lower experience may indicate higher replaceability.

Figure 6:
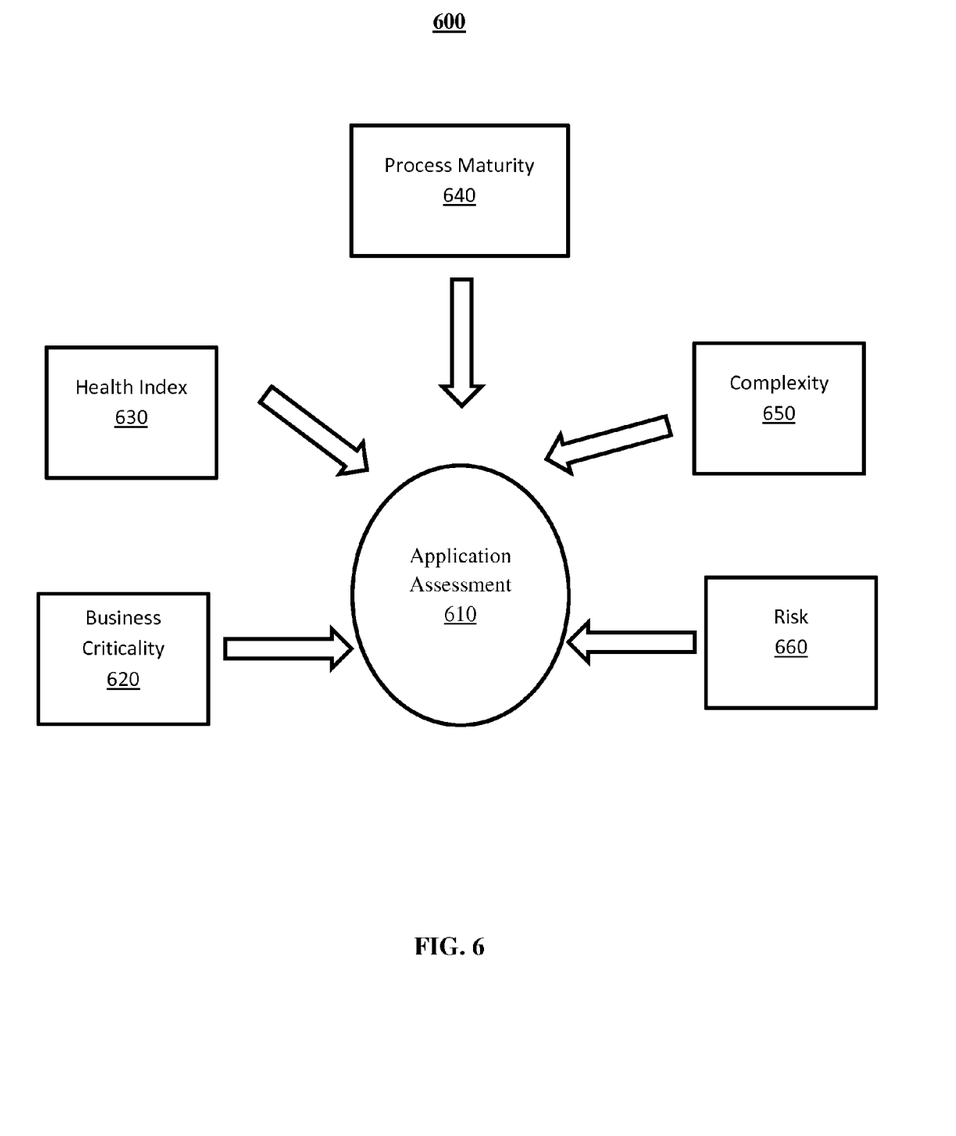
FIG. 6 shows an exemplary conceptual diagram for application assessment.

FIG. 6 shows an exemplary conceptual diagram for application assessment. Referring to FIG. 6, application assessment is done using a plurality of attributes that include, but are not limited to, business criticality 620, health index 630, process maturity 640, complexity 650 and risk 660.

According to an embodiment of the invention, business criticality 620 of an application is determined using variables such as severity of service levels, end user volumes, frequency of usage, departments using application, usage of application by external sources, and the like. Health index 630 of the application is measured by parameters such as service request volume, frequency of release, level of documentation, ease of maintenance, recovery capability, age of application, and so forth. Process maturity 640 is determined by parameters including, but not limited to, compliance of application with architectural standards, maturity level of operational process and adoption of quality model or framework. Likewise, complexity 650 of the application is measured on parameters such as number of interfaces, number of technologies, use of third party components, complexity of business logic, sensitivity to regulatory compliance, and life cycle phase of application. Finally, risk exposure 660 of the application is indicated by the contractor to employee ratio.

According to an embodiment of the invention, to assess the overall impact and risk exposure from the proposed consolidation, the applications that the segmented contractors develop, enhance, maintain and support are assessed.

According to another embodiment of the invention, replacing a contractor is determined by considering the results of both the contractor and application assessment on a normalized scale. Additionally, the contractor assessment may be given a higher weight over the application assessment.

Figure 7:
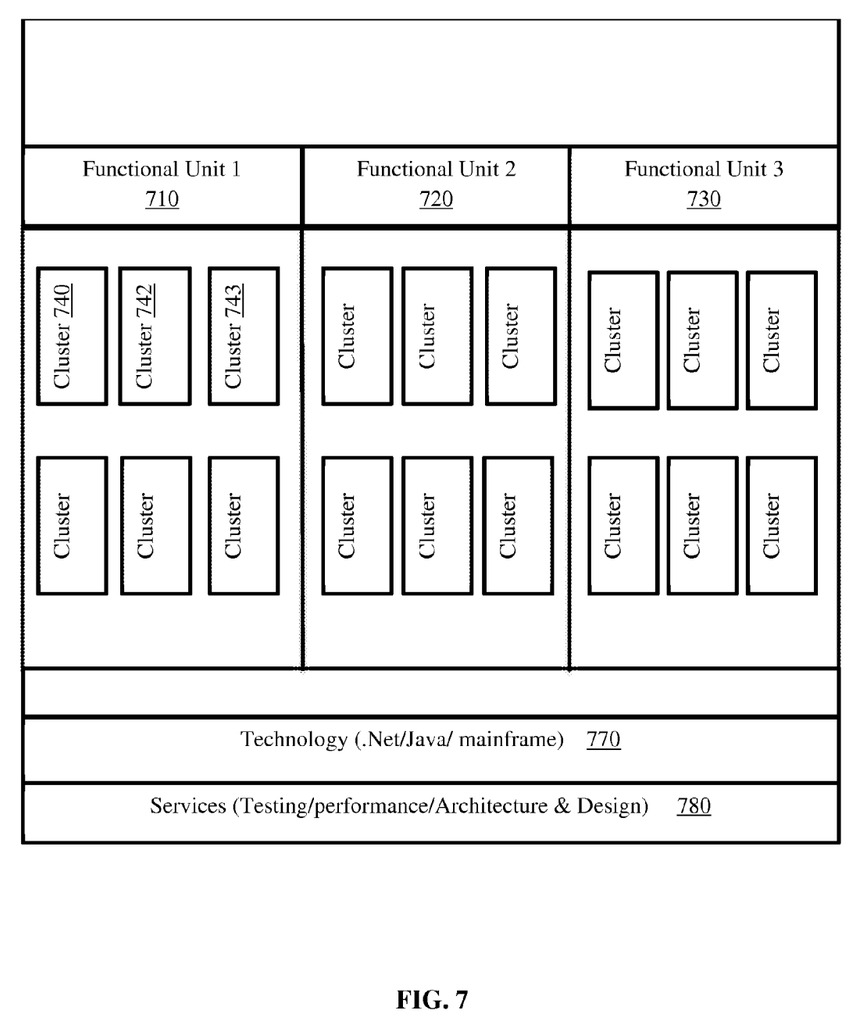
FIG. 7 shows an exemplary conceptual diagram for consolidation of evaluated contractors.

FIG. 7 shows an exemplary conceptual diagram for consolidation of evaluated and shortlisted contractors. According to an embodiment of the invention, cluster 740 is defined by categories. Examples of categories include, but are not limited to, functional unit, application or technology platform 770, and service types or project execution methodology 780. Functional units 710, 720 and 730 include clusters. Cluster 740 is based on a portfolio or an application that helps to identify which vendor and associated contractors can be targeted for consolidation. Further, FIG. 7 highlights that logical clusters based on applications, service lines and technologies can be more easily formed with fewer vendors in the landscape, leading to an optimized delivery framework According to an embodiment of the invention, the contractors may be grouped by their technical stream 770 such as .NET, java, mainframe etc. According to another embodiment of the invention, contractors may be grouped by their service line such as testing, support, architecture design. According to still another embodiment of the invention, the contractors may be grouped by their immediate or next level managers. Further, contractors may be grouped by the project execution methodology. For instance, contractors may be grouped by software development life cycle (SDLC) models such as Agile, waterfall, Extreme Programming (XP) and the like. Contractors may also be grouped by their function within a functional unit FIG. 8 shows an exemplary computing environment.

One or more of the above-described techniques can be implemented in or involve one or more computer systems. FIG. 8 illustrates a generalized example of a computing environment 800. The computing environment 800 is not intended to suggest any limitation as to scope of use or functionality of described embodiments.

Figure 8:
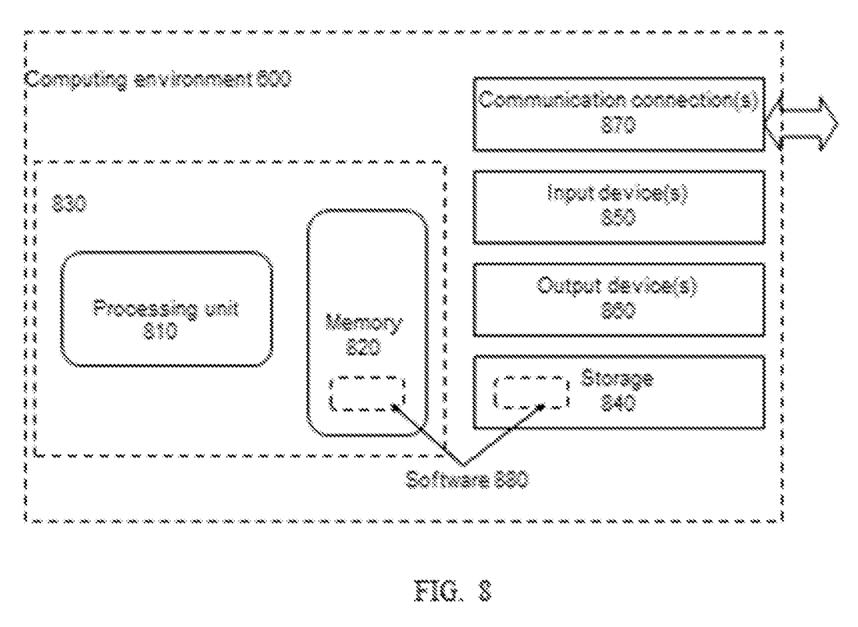
FIG. 8 shows an exemplary computing environment.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. In some embodiments, the memory 820 stores software 880 implementing described techniques.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. In some embodiments, the storage 840 stores instructions for the software 880.

The input device(s) 850 may be a touch input device such as a keyboard, mouse, pen, trackball, touch screen, or game controller, a voice input device, a scanning device, a digital camera, or another device that provides input to the computing environment 800. The output device(s) 860 may be a display, printer, speaker, or another device that provides output from the computing environment 800.

The communication connection(s) 870 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 8, computer-readable storage media include memory 820 and/or storage 840. As should be readily understood, the term computer-readable storage media does not include communication connections (e.g., 870) such as modulated data signals.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiments shown but is to be accorded the widest scope consistent with the principles and features described herein.

We claim:

1. A computer implemented method executed by one or more computing devices for assessing and consolidating contractor data in an organization from a plurality of data sources, the method comprising:

collecting, by at least one of the computing devices, the contractor data from the plurality of data sources, wherein the data sources comprise existing information systems, surveys and interviews;

segmenting, by at least one of the computing devices, the collected contractor data using a decision matrix, wherein the decision matrix comprises a functional area index and a vendor index; wherein the functional area index comprises:

vendor fragmentation, wherein the vendor fragmentation is calculated based on a ratio of contractors to vendors within a functional unit: and people risk, wherein the people risk is calculated based on a ratio of contractors to employees; and wherein the vendor index comprises:

breadth and depth of vendor, wherein the breadth of the vendor is a percentage of contractors from the vendor within the functional unit and the depth of the vendor is the percentage of contractors from the vendor working on niche and proprietary skills, wherein the niche skills comprise expertise in proprietary software or specialization in a technology;

evaluating, by at least one of the computing devices, the segmented contractor data for its impact on ongoing business activities in the organization, wherein the evaluation of the segmented contractor data comprises performing at least contractor assessment and application assessment;

consolidating, by at least one of the computing devices, the evaluated contractor data to form at least one logical cluster within a plurality of predefined categories, wherein the predefined categories comprise functional unit, application platform, technology platform and service type; and deleting contractor data corresponding to one or more contractors based on results of one or more of the segmenting, evaluating and consolidating.

2. The method of claim 1, wherein the step of consolidating the segmented collected contractor data is preceded by the step of determining the suitability of the said method with client sourcing strategy.

3. The method of claim 1, wherein the existing information systems comprise repositories at user's end that store employee and application data.

4. The method of claim 1, wherein the contractor data is associated with contractors operating in an information technology (IT) domain.

5. The method of claim 1, wherein the contractor assessment comprises evaluating contractors on a plurality of attributes comprising service duration, responsibility, skill, knowledge, performance, and cost.

6. The method of claim 1, wherein the application assessment comprises evaluating contractors on a plurality of attributes comprising business criticality, health index, process maturity, complexity, and risk.

7. The method of claim 1, wherein segmenting comprises evaluating the plurality of vendors by position within a functional unit and across functional units.

8. A system for assessing and consolidating contractor data from a plurality of data sources, comprising:

a memory; and a processor operatively coupled to the memory, the processor configured to perform the steps of:

collecting the contractor data from the plurality of data sources, wherein data sources comprise existing information systems, surveys and interviews;

segmenting the collected contractor data using a decision matrix, wherein the decision matrix comprises a functional area index and a vendor index; wherein the functional area index comprises:

vendor fragmentation and people risk, wherein the vendor fragmentation is calculated based on a ratio of contractors to vendors within a functional unit, wherein the people risk is calculated based on a ratio of contractors to employees; and wherein the vendor index comprises:

breadth and depth of vendor, wherein the breadth of the vendor is a percentage of contractors from the vendor within the functional unit and the depth of the vendor is the percentage of contractors from the vendor working on niche and proprietary skills, wherein the niche skills comprise expertise in proprietary software or specialization in a technology;

evaluating the segmented contractor data for its impact on ongoing business activities in the organization, wherein the evaluation of the segmented contractor data comprises performing at least contractor assessment and application assessment;

consolidating the evaluated contractor data to form at least one logical cluster within a plurality of predefined categories, wherein the predefined categories comprise functional unit, application platform, technology platform and service type; and presenting the consolidated contractor data to a user.

9. The system of claim 8, the processor further configured to perform the steps of:

deleting contractor data corresponding to one or more contractors based on the evaluated contractor data.

10. The system of claim 8, wherein the contractor assessment comprises evaluating contractors on a plurality of attributes comprising service duration, responsibility, skill, knowledge, performance, and cost.

11. The system of claim 8, wherein the application assessment comprises evaluating contractors on a plurality of attributes comprising business criticality, health index, process maturity, complexity, and risk.

12. A non-transitory computer-readable medium storing computer readable code that when executed by a computing device performs a method for assessing and consolidating contractor data from a plurality of data sources, the method comprising:

collecting the contractor data from the plurality of data sources, wherein data sources comprise existing information systems, surveys and interviews;

segmenting the collected contractor data using a decision matrix, wherein the decision matrix comprises a functional area index and a vendor index; wherein the functional area index comprises:

vendor fragmentation and people risk, wherein the vendor fragmentation is calculated based on a ratio of contractors to vendors within a functional unit, wherein the people risk is calculated based on a ratio of contractors to employees; and wherein the vendor index comprises:

breadth and depth of vendor, wherein the breadth of the vendor is a percentage of contractors from the vendor within the functional unit and the depth of the vendor is the percentage of contractors from the vendor working on niche and proprietary skills, wherein the niche skills comprise expertise in proprietary software or specialization in a technology;

evaluating the segmented contractor data for its impact on ongoing business activities in the organization, wherein the evaluation of the segmented contractor data comprises performing at least contractor assessment and application assessment;

consolidating the evaluated contractor data to form at least one logical cluster within a plurality of predefined categories, wherein the predefined categories comprise functional unit, application platform, technology platform and service type; and presenting the consolidated contractor data to a user.

13. The non-transitory computer-readable medium of claim 12, the method further comprising:

deleting contractor data corresponding to one or more contractors based on the evaluated contractor data.

14. The method of claim 1, wherein the segmentation of the collected contractor data comprises placing the collected contractor data in the decision matrix based on the functional area index and the vendor index.

15. The non-transitory computer-readable medium of claim 12, wherein the contractor assessment comprises evaluating contractors on a plurality of attributes comprising service duration, responsibility, skill, knowledge, performance, and cost.

16. The non-transitory computer-readable medium of claim 12, wherein the application assessment comprises evaluating contractors on a plurality of attributes comprising business criticality, health index, process maturity, complexity, and risk.

* * * * *